United States Patent
Duval et al.

(10) Patent No.: US 10,850,834 B2
(45) Date of Patent: Dec. 1, 2020

(54) LANDING GEAR SYSTEMS FOR AIRCRAFT EMPLOYING A CROSS TUBE

(71) Applicant: Textron Innovations Inc., Providence, RI (US)

(72) Inventors: Sebastien Duval, Terrebonne (CA); Marc Ouellet, Sainte-Sophie (CA)

(73) Assignee: Textron Innovations Inc., Providence, RI (US)

( * ) Notice: Subject to any disclaimer, the term of this patent is extended or adjusted under 35 U.S.C. 154(b) by 502 days.

(21) Appl. No.: 15/840,113

(22) Filed: Dec. 13, 2017

(65) Prior Publication Data
US 2019/0176976 A1   Jun. 13, 2019

(51) Int. Cl.
| | | |
|---|---|---|
| *B64C 25/66* | (2006.01) | |
| *B64C 25/34* | (2006.01) | |
| *B64C 25/14* | (2006.01) | |
| *B64C 25/52* | (2006.01) | |
| *B64C 25/32* | (2006.01) | |

(52) U.S. Cl.
CPC .............. *B64C 25/66* (2013.01); *B64C 25/14* (2013.01); *B64C 25/34* (2013.01); *B64C 25/52* (2013.01); *B64C 2025/325* (2013.01)

(58) Field of Classification Search
CPC ......... B64C 25/66; B64C 25/34; B64C 25/14; B64C 25/52; B64C 2025/325
See application file for complete search history.

(56) References Cited

U.S. PATENT DOCUMENTS

| 4,270,711 A | 6/1981 | Cresap et al. |
|---|---|---|
| 5,060,886 A | 10/1991 | Davis et al. |
| 8,733,691 B2 | 5/2014 | Landry |
| 2011/0233323 A1* | 9/2011 | Engleder ................ B64C 25/52 244/17.17 |
| 2016/0039519 A1* | 2/2016 | Didey ...................... F16H 1/06 244/103 S |

OTHER PUBLICATIONS

VW Staff, Passenger Drone Launches Two-Seater Electric Manned Aircraft, Value Walk, Sep. 28, 2017.

* cited by examiner

*Primary Examiner* — Joshua J Michener
*Assistant Examiner* — Cindi M Curry
(74) *Attorney, Agent, or Firm* — Lawrence Youst PLLC (57) ABSTRACT

A landing gear system for an aircraft includes an aft landing gear fitting coupled to the aircraft and a cross tube rotatably coupled to the aft landing gear fitting. The landing gear system also includes first and second wheel fittings coupled to the first and second ends of the cross tube, respectively, and first and second wheels rotatably coupled to the first and second wheel fittings, respectively.

19 Claims, 10 Drawing Sheets

LANDING GEAR SYSTEMS FOR AIRCRAFT EMPLOYING A CROSS TUBE

TECHNICAL FIELD OF THE DISCLOSURE

The present disclosure relates, in general, to landing gear systems operable for use on aircraft and, in particular, to landing gear systems operable for use on rotorcraft that employ one or more cross tubes operable to have wheels coupled thereto.

BACKGROUND

Rotorcraft employ different types of landing gear systems depending upon operational needs and other factors. One common type of landing gear system is a skid landing gear system, which typically includes a pair of skids on which the rotorcraft lands. Skid landing gear systems, however, can sustain damage during run-on landings and are unable to be taxied on the ground without the aid of a helicopter dolly or ground-handling wheels. While wheel landing gear systems address both of these drawbacks of skid landing gear systems, wheel landing gear systems, as currently implemented, present other challenges. For example, retractable wheel landing gear kits are expensive and require extensive modifications to the rotorcraft airframe in order to replace a skid landing gear system. Retractable wheel landing gear systems are also expensive to design, test and certify, in part because of the extensive airframe modifications they require. Current wheel landing gear systems also require complex, and often heavy, mechanisms that can negatively impact the cost, weight and maintenance requirements of the rotorcraft. Accordingly, a need has arisen for a wheel landing gear system that addresses these and other drawbacks of current wheel landing gear systems, and which may be cost-effectively installed on a wide variety of aircraft including rotorcraft previously equipped with a skid landing gear system.

SUMMARY

In a first aspect, the present disclosure is directed to a landing gear system for an aircraft including an aft landing gear fitting coupled to the aircraft and a cross tube rotatably coupled to the aft landing gear fitting. The landing gear system also includes first and second wheel fittings coupled to the first and second ends of the cross tube, respectively, and first and second wheels rotatably coupled to the first and second wheel fittings, respectively.

In some embodiments, the aft landing gear fitting may include a pivot axis extending in a fore-aft direction, and the cross tube may be rotatably coupled to the aft landing gear fitting about the pivot axis. In certain embodiments, the aft landing gear fitting may be further adapted to receive a skid gear cross tube, and the skid gear cross tube and the cross tube may be adapted to be interchangeably coupled to the aft landing gear fitting. In some embodiments, the skid gear cross tube and the cross tube may each have a circular cross section having a diameter and the diameter of the skid gear cross tube may be approximately equal to the diameter of the cross tube. In certain embodiments, the cross tube may include a generally horizontal midsection rotatably coupled to the aft landing gear fitting. In some embodiments, the cross tube may include first and second transition sections each interposed between the midsection and one of the ends of the cross tube. In such embodiments, the first transition section may slope downward from the midsection to the first end of the cross tube, and the second transition section may slope downward from the midsection to the second end of the cross tube. In certain embodiments, the first and second ends of the cross tube may include generally vertical first and second ends.

In some embodiments, the cross tube may include a material adapted to flex to absorb shocks caused by ground operations of the aircraft. In certain embodiments, the cross tube may include an aluminum alloy. In some embodiments, the cross tube may form a shape adapted to flex to absorb shocks caused by ground operations of the aircraft. In certain embodiments, the cross tube may be rotatably coupled to the aft landing gear fitting about an axis lateral to the aircraft. In some embodiments, the landing gear system may include a retraction actuator coupled to the cross tube, and the retraction actuator may be adapted to rotate the cross tube between an extended position and a retracted position about the lateral axis. In certain embodiments, the wheels may be inward or outward facing. In some embodiments, the aircraft may be a helicopter. In certain embodiments, the landing gear system may include first and second skids adapted to couple to the first and second ends of the cross tube, and the first and second skids may be interchangeable with the first and second wheel fittings.

In a second aspect, the present disclosure is directed to an aircraft including a fuselage and a landing gear system. The landing gear system includes an aft landing gear fitting coupled to the underside of the fuselage and a cross tube rotatably coupled to the aft landing gear fitting. The landing gear system also includes first and second wheel fittings coupled to the first and second ends of the cross tube, respectively, and first and second wheels rotatably coupled to the first and second wheel fittings, respectively.

In some embodiments, the aft landing gear fitting may include a bridge coupled to the underside of the fuselage and a pivot connection fixedly coupled to the cross tube. In such embodiments, the pivot connection may be rotatably coupled to the bridge at a pivot axis to allow the cross tube to pivot relative to the fuselage. In certain embodiments, the bridge may include first and second ends coupled to the underside of the fuselage. In some embodiments, the aft landing gear fitting may include a pivot pin coupling the pivot connection to the bridge at the pivot axis. In certain embodiments, the landing gear system may include a strut having first and second ends respectively coupled to the fuselage and the cross tube. In other embodiments, the landing gear system may include a plurality of struts including first and second struts each having first and second ends, the first ends of the struts coupled to the fuselage, the second ends of the struts each coupled to one of the wheel fittings. In some embodiments, the struts may each include an inline damper. In certain embodiments, the landing gear system may include a braking subsystem adapted to selectively reduce rotation of the wheels. In some embodiments, the landing gear system may include a forward wheel assembly removably coupled to the underside of the fuselage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
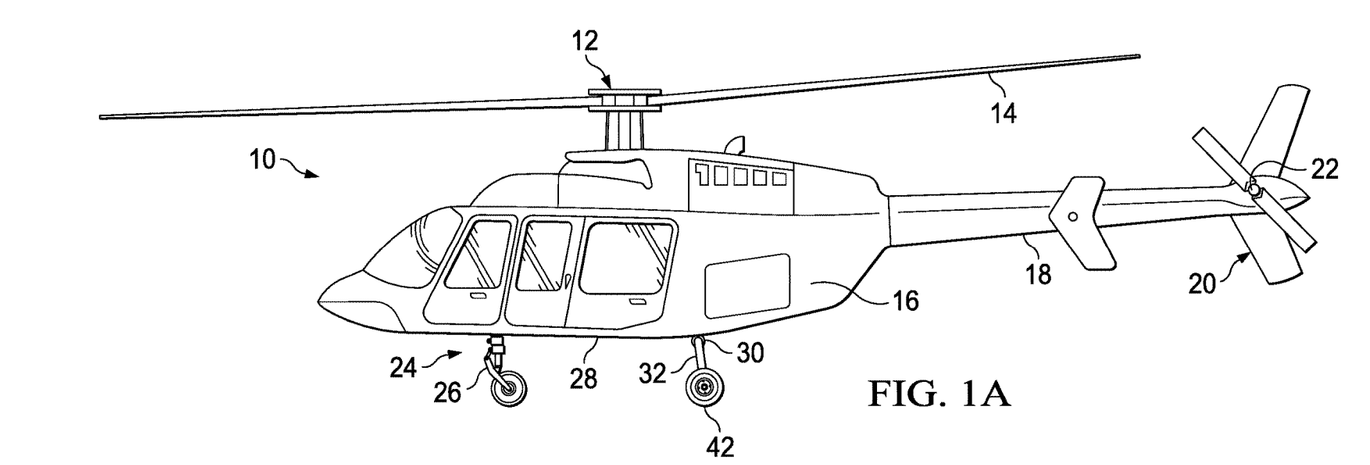
FIGS. 1A-1B are schematic illustrations of a rotorcraft including a wheel landing gear system in accordance with embodiments of the present disclosure.
Figure 1B:
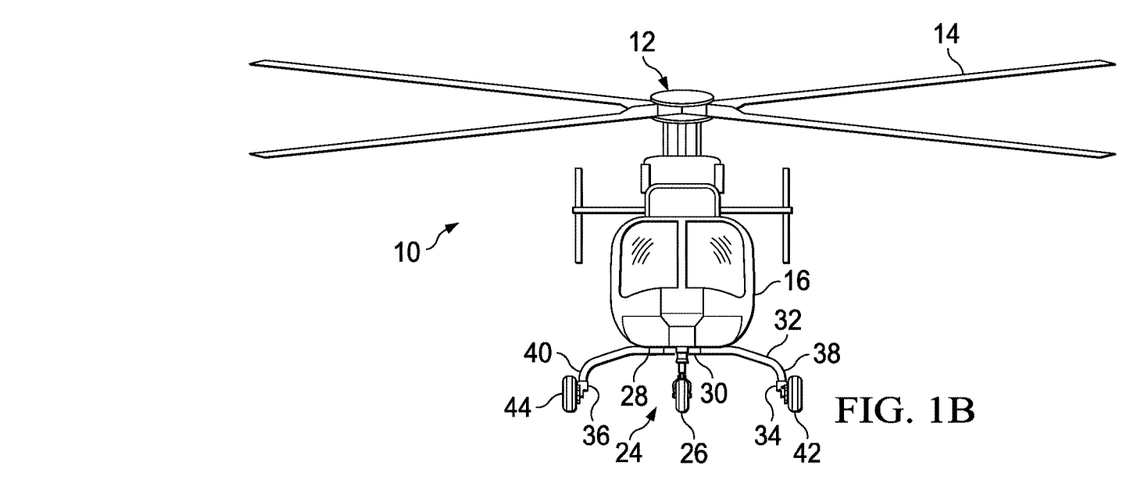

Referring to FIGS. 1A-1B in the drawings, a rotorcraft is schematically illustrated and generally designated 10. In the illustrated embodiment, rotorcraft 10 is depicted as a helicopter having a main rotor 12, which includes a plurality of rotor blade assemblies 14. Main rotor 12 is rotatable relative to a fuselage 16. The pitch of rotor blade assemblies 14 can be collectively and/or cyclically manipulated to selectively control direction, thrust and lift of rotorcraft 10. A tailboom 18 extends from fuselage 16. A tail section 20 includes a tail rotor 22 that is rotatably coupled to the aft portion of tailboom 18. Tail rotor 22 controls the yaw of rotorcraft 10.

Wheel landing gear system 24 provides ground support for rotorcraft 10. The forward portion of wheel landing gear system 24 includes a forward wheel assembly 26 that may be removably coupled to underside 28 of fuselage 16. The aft portion of wheel landing gear system 24 includes an aft landing gear fitting 30 coupled to underside 28 of fuselage 16. A cross tube 32 is coupled to aft landing gear fitting 30. Wheel fittings 34, 36 are coupled to ends 38, 40 of cross tube 32, respectively. Wheels 42, 44, which face outward from the longitudinal centerline of rotorcraft 10, are rotatably coupled to wheel fittings 34, 36, respectively. Thus, wheels 42, 44 are rotatable relative to wheel fittings 34, 36, respectively. Cross tube 32 may act as a leaf spring suspension for rotorcraft 10 that absorbs and/or dampens shock impulses, including shocks experienced by rotorcraft 10 during ground operations such as landing and taxi operations. Wheel landing gear system 24 accommodates the natural frequencies of rotorcraft 10 to reduce or prevent ground resonance during takeoff and landing. In some embodiments, wheel landing gear system 24 may replace, and therefore be interchangeable with, a skid landing gear system. Wheel landing gear system 24 may utilize at least a portion of the components of a previously installed skid landing gear system, such as aft landing gear fitting 30, to facilitate interchangeability between the two landing gear systems.

It should be appreciated that rotorcraft 10 is merely illustrative of a variety of aircraft that can implement the embodiments disclosed herein. Indeed, wheel landing gear system 24 may be utilized on any aircraft with landing capabilities. Other aircraft implementations can include hybrid aircraft, tiltrotor aircraft, tiltwing aircraft, quad tiltrotor aircraft, unmanned aircraft, gyrocopters, airplanes and the like. As such, those skilled in the art will recognize that wheel landing gear system 24 can be integrated into a variety of aircraft configurations. It should be appreciated that even though aircraft are particularly well-suited to implement the embodiments of the present disclosure, non-aircraft vehicles and devices can also implement the embodiments.

Figures 2A, 2B:
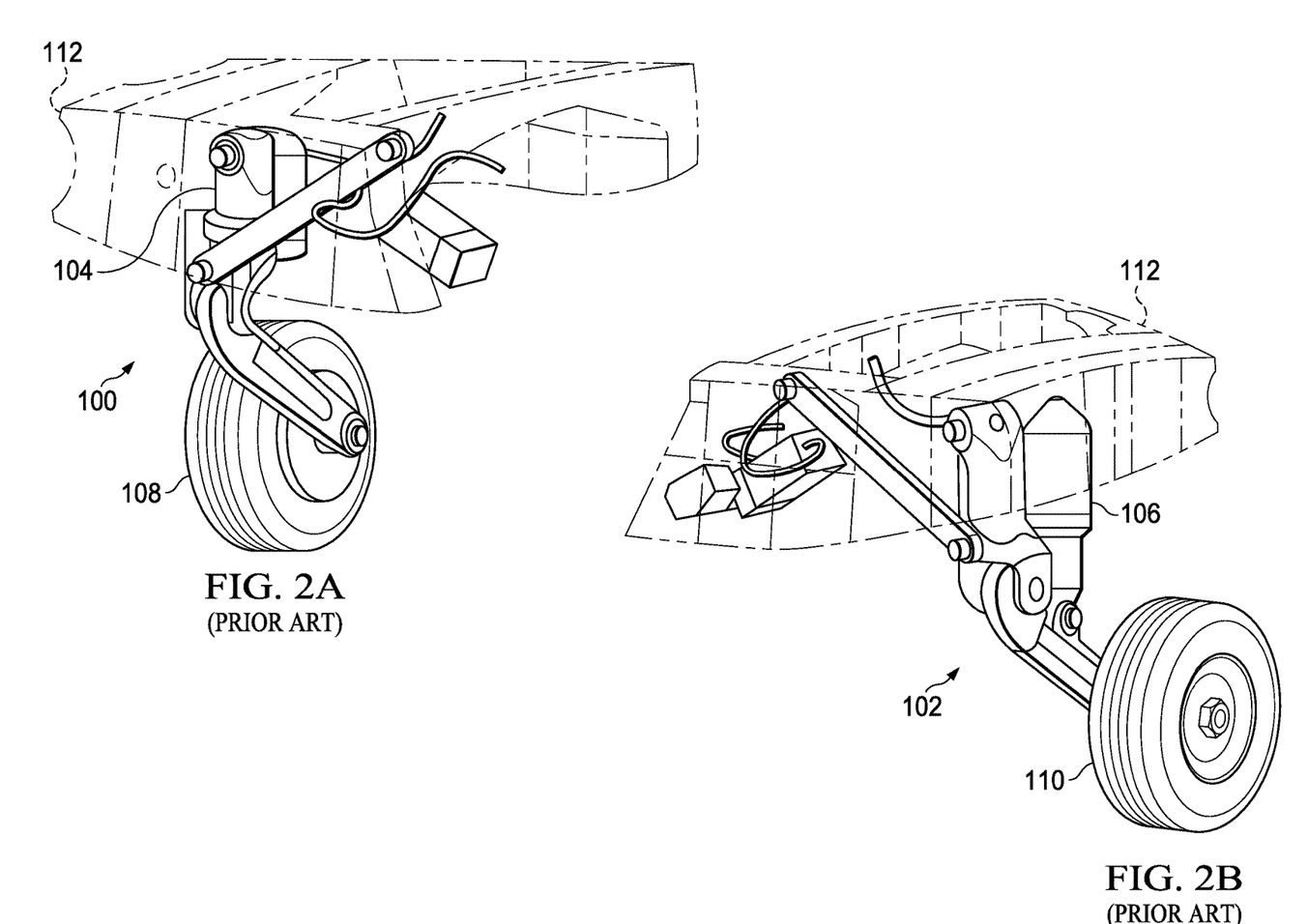
FIGS. 2A-2D are various views of prior art landing gear systems.

Referring to FIGS. 2A-2D in the drawings, prior art rotorcraft landing gear systems are schematically illustrated. FIGS. 2A-2B show right and left wheel assemblies 100, 102, each of which include a shock absorber 104, 106, such as an oleo strut, respectively. Shock absorbers 104, 106 are mounted between wheels 108, 110 and airframe 112 of the rotorcraft, respectively. While shock absorbers 104, 106 absorb shock impulses experienced by the rotorcraft, shock absorbers 104, 106 are typically expensive and require complex machined fittings to avoid ground resonance. These fittings and other attachments require expensive and complex modifications to airframe 112 to add additional anchor points and may require sponsons and clearance in the belly of the rotorcraft if wheel assemblies 100, 102 are retractable. Wheel assemblies 100, 102 are also difficult to remove, and therefore are not interchangeable with other types of landing gear, such as skid landing gear.

Figure 2C:
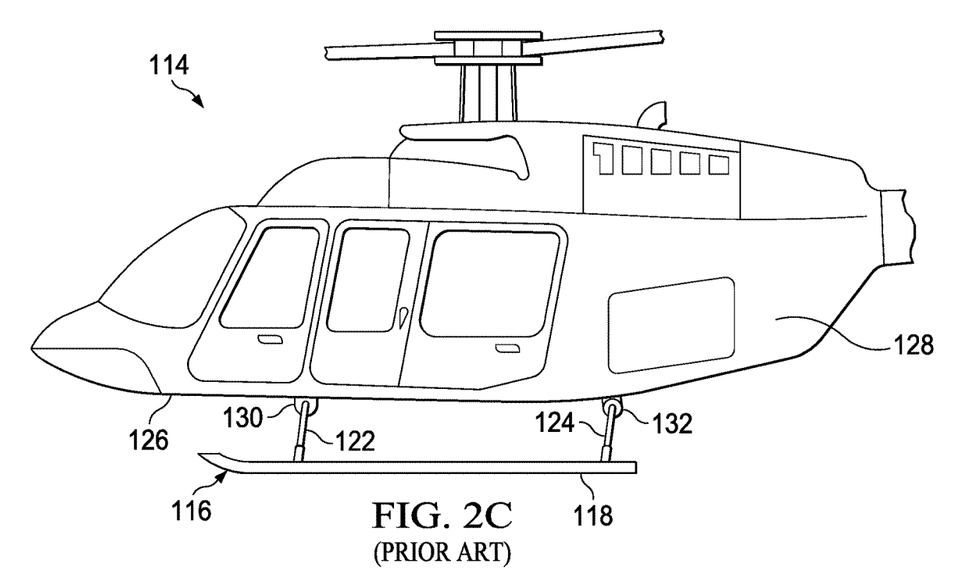
Figure 2D:
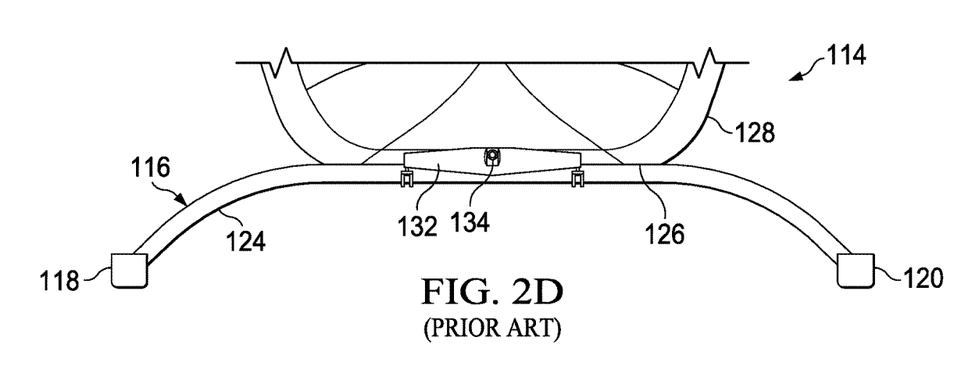

FIGS. 2C-2D show rotorcraft 114 with skid landing gear 116. Skid landing gear 116 includes skids 118, 120 mounted to forward and aft skid gear cross tubes 122, 124. Forward skid gear cross tube 122 is mounted to underside 126 of fuselage 128 by a forward landing gear fitting 130. Aft skid gear cross tube 124 is mounted to underside 126 of fuselage 128 by aft landing gear fitting 132. Aft landing gear fitting 132 may include a rocker beam or other pivot point 134 to ensure that aft skid gear cross tube 124 can pivot about a roll axis to prevent ground resonance or other vibrational phenomenon. Skid landing gear 116 may be undesirable in some operational circumstances, such as run-on landings and taxi operations, for which a wheel landing gear system is better suited.

Figure 3A:
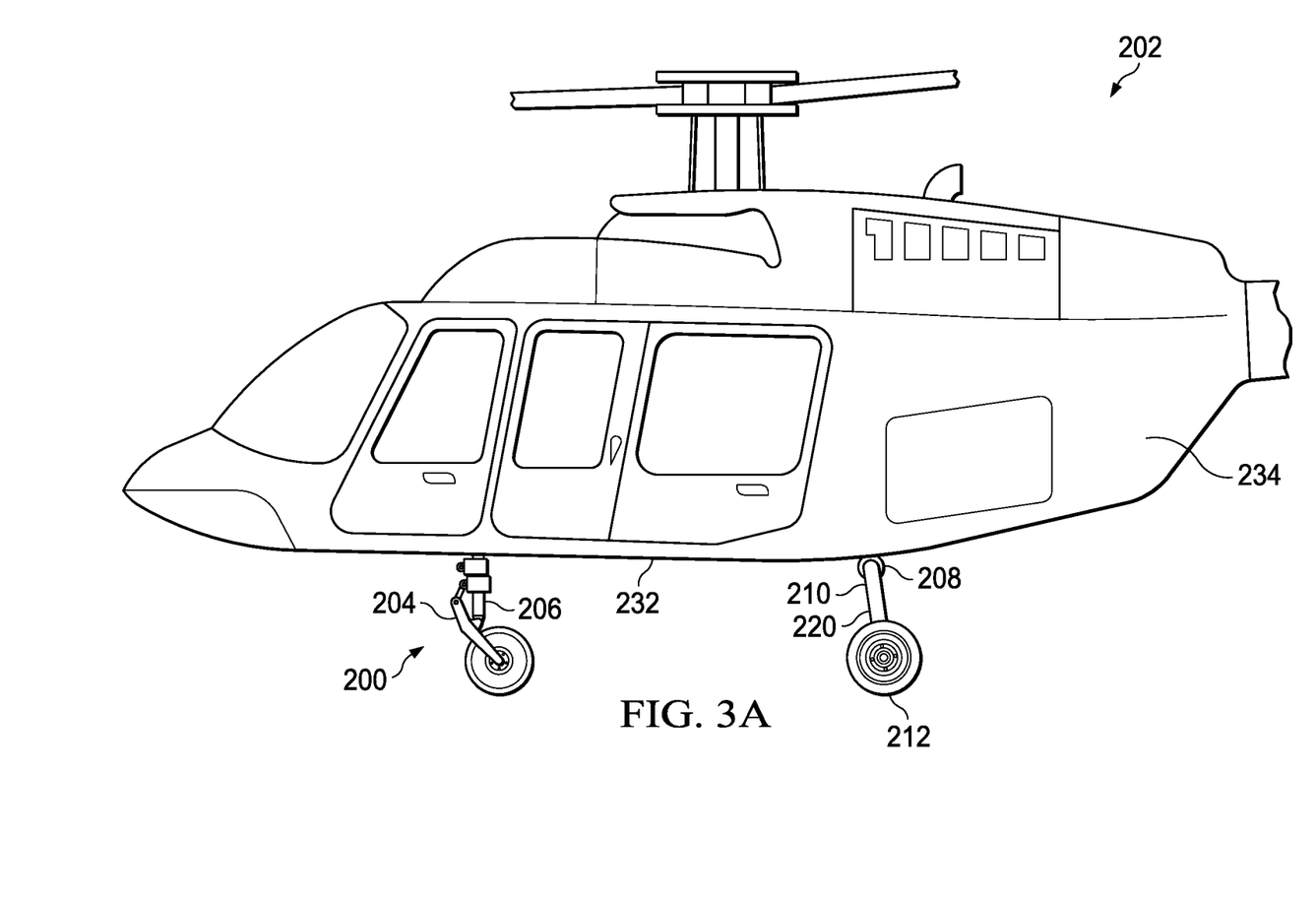
FIGS. 3A-3C are various views of a landing gear system for a rotorcraft in accordance with embodiments of the present disclosure.
Figure 3B:
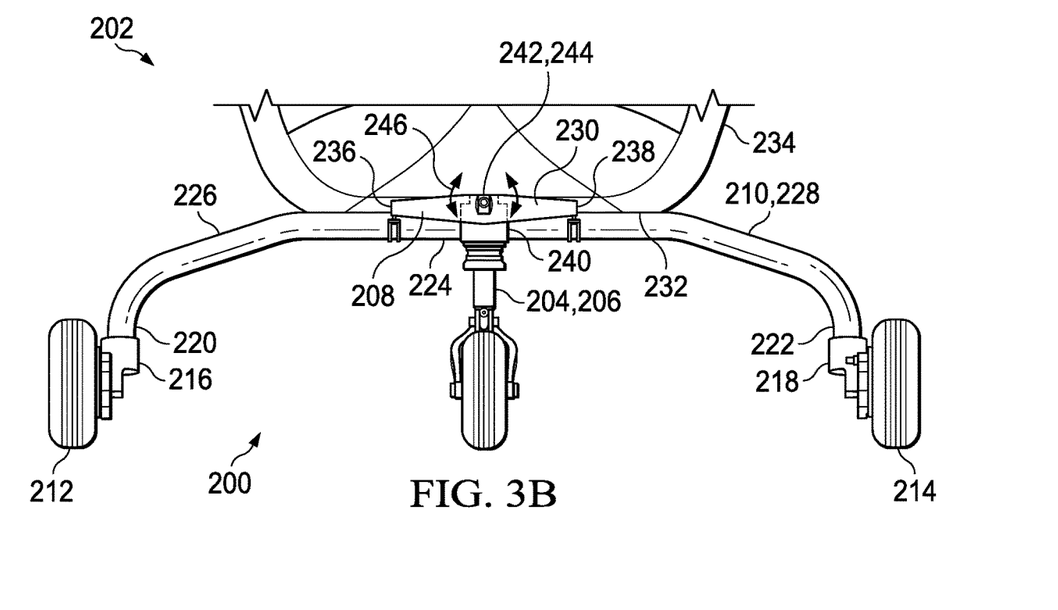
Figure 3C:
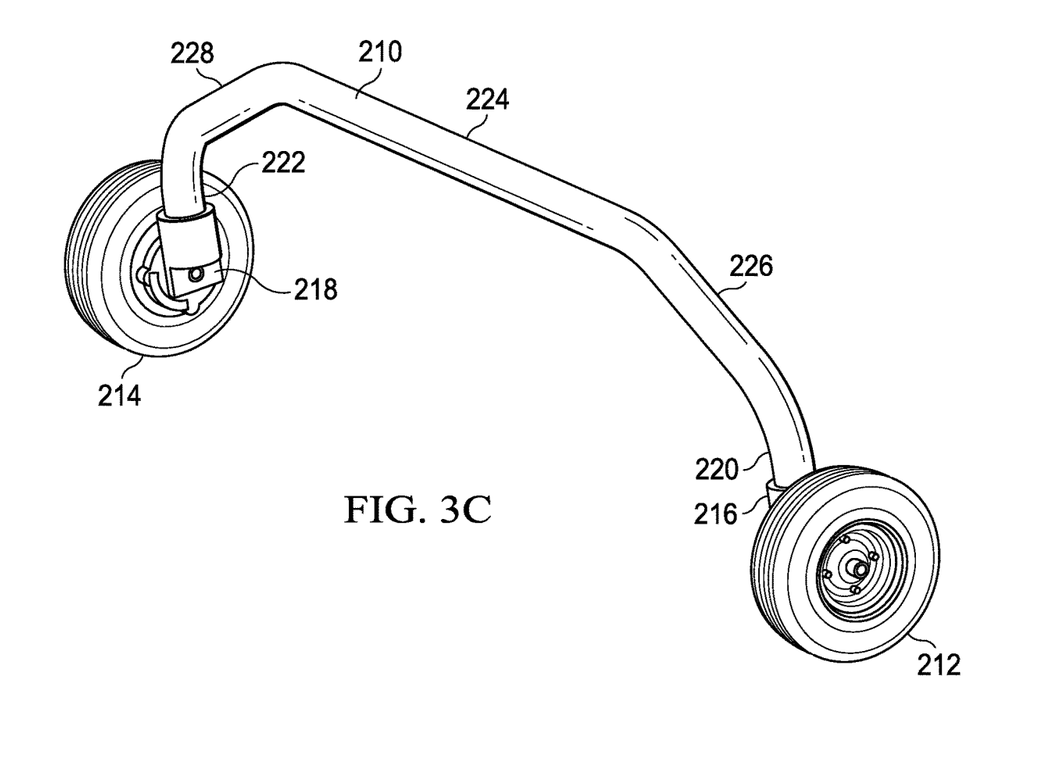

Referring to FIGS. 3A-3C, a rotorcraft including landing gear system 200 is schematically illustrated and generally designated 202. Landing gear system 200 includes forward wheel assembly 204, which may include shock absorber 206. Landing gear system 200 also includes aft landing gear fitting 208, to which cross tube 210 is rotatably, or pivotably, coupled. Wheels 212, 214 are rotatably coupled to wheel fittings 216, 218, which are coupled to ends 220, 222 of cross tube 210. Wheels 212, 214 are outward-facing wheels. Cross tube 210 includes a generally horizontal midsection 224, which is rotatably coupled to aft landing gear fitting 208. Ends 220, 222 of cross tube 210 are generally vertical to receive wheel fittings 216, 218, respectively. Cross tube 210 also includes transition sections 226, 228, each of which are interposed between midsection 224 and one of ends 220, 222, respectively. In particular, transition section 226 slopes downward from midsection 224 to end 220 of cross tube 210. Likewise, transition section 228 slopes downward from midsection 224 to end 222 of cross tube 210. Transition sections 226, 228 may be straight, as illustrated, or have a curved shape. Overall, cross tube 210 approximates a "C" shape, although in other embodiments cross tube 210 may form any shape adapted to flex in response to shocks caused by ground operations of rotorcraft 202, thereby facilitating safety and comfort during such operations.

Cross tube 210 may be composed of any material exhibiting flexibility in response to shocks caused by ground operations of rotorcraft 202. In some embodiments, cross tube 210 may be formed from the same or similar material as that used for skid gear cross tubes, such as aft skid gear cross tube 124 in FIGS. 2C-2D. Cross tube 210 may be chemically milled to customize the lengthwise stiffness and/or weight of cross tube 210. Cross tube 210 may be formed from a metallic alloy, such as an aluminum alloy.

When rotorcraft 202 is resting on the ground but is in the process of running the rotor up to operational speed, vibrations of increasing frequency are generated by the rotor and transmitted to the airframe. The non-rotating portion of the airframe has a number of natural vibrational modes dependent upon the airframe configuration and the flexibility of various structural components. If the vibrations generated by the rotor couple to any of the vibrational modes of the airframe, the rotor kinetic energy can be suddenly transferred to the airframe and generate violent vibrations. This condition is termed "ground resonance." To reduce or avoid the occurrence of ground resonance, the airframe may be constructed in such a manner that the rotor vibrations are not coupled to the airframe. Aft landing gear fitting 208 helps to lower the natural fuselage/landing gear pitch and roll mode frequencies to give a greater ground resonance stability margin.

Aft landing gear fitting 208 includes a bridge 230 coupled to underside 232 of fuselage 234. Bridge 230 may be coupled to fuselage 234 by bridge ends 236, 238. Bridge ends 236, 238 may be coupled to longitudinal or lateral airframe beams or support members extending along underside 232 of fuselage 234. Aft landing gear fitting 208 also includes a pivot connection 240 fixedly coupled to cross tube 210. Pivot connection 240 is rotatably, or pivotably, coupled to bridge 230 at a pivot axis 242 that extends in a fore-aft direction. Thus, cross tube 210 is rotatably coupled to aft landing gear fitting 208 about pivot axis 242. A pivot pin 244 couples pivot connection 240 to bridge 230 at pivot axis 242 to allow cross tube 210 to pivot relative to fuselage 234. Pivot axis 242 is positioned above cross tube 210. Coupling bridge 230 to cross tube 210 in this manner permits fuselage 234 to pivot about pivot axis 242 to lower the natural roll frequency of the airframe of rotorcraft 202, thereby increasing the margin of stability to prevent ground resonance.

When rotorcraft 202 is resting on the ground, cross tube 210 is flexed upward so that a portion of the rotorcraft weight is carried through pivot pin 244. This condition allows bridge 230, which is supporting fuselage 234, to rock back and forth along arrows 246 about a median fore-aft axis, or pivot axis 242, defined by pivot pin 244. The single pivot support on cross tube 210 permits the airframe of rotorcraft 202 to roll (rock) at a lower rate than occurs when the airframe is rigidly attached to cross tube 210. This further offsets the airframe vibrational modes from the rotor frequencies to enhance the margin of stability and reduce the possibility that rotorcraft 202 will encounter ground resonance. In a hard landing situation, cross tube 210 is forced upward into bridge 230, which is in turn forced into the fuselage airframe. The deformation of these components serves to absorb the energy of a hard landing and to protect the occupants and other rotorcraft components.

In some embodiments, wheel landing gear system 200 may be interchangeable with skid landing gear, such as skid landing gear 116 in FIGS. 2C-2D. In such embodiments, skid landing gear may be removed and replaced by wheel landing gear system 200, thereby providing rotorcraft 202 with a set of three wheels. In other embodiments, wheel landing gear system 200 may include more or less than three wheels. Wheel landing gear system 200 may be installed on rotorcraft 202 using at least a portion of the same attachment points used to attach skid landing gear to rotorcraft 202. For example, aft landing gear fitting 208 may be adapted to receive or couple to either cross tube 210 or a skid gear cross tube, such as aft skid gear cross tube 124 in FIGS. 2C-2D. Thus, the skid gear cross tube and cross tube 210 may be interchangeably coupled to aft landing gear fitting 208. To ensure a proper fit with aft landing gear fitting 208, the skid gear cross tube and cross tube 210 may each have a circular cross-section across their respective midsections that have approximately equal diameters.

In some embodiments, to upgrade from skid landing gear to wheel landing gear system 200, the skids and skid gear cross tubes are first removed from rotorcraft 202. The forward landing gear fitting, such as forward landing gear fitting 130 in FIGS. 2C-2D, may then be removed. A forward wheel landing gear access cover (not shown) on underside 232 of fuselage 234 may then be removed. Forward wheel assembly, or taxi wheel, 204 may be removably coupled to a fitting exposed by the removal of the access cover. The fitting to which forward wheel assembly 204 is coupled may be provisioned on the front lift frame of rotorcraft 202. With regard to the aft portion of wheel landing gear system 200, cross tube 210 may be installed on the same aft landing gear fitting 208 that was used to mount the aft skid gear cross tube, such as aft skid gear cross tube 124 in FIGS. 2C-2D.

The illustrative embodiments allow faster installation and removal of a wheel landing gear kit with little or no structural modifications to the airframe of rotorcraft 202 to replace basic skid gear with wheel landing gear system 200. The interchanging of skid landing gear with wheel landing gear system 200 may be based on the customer mission profile or customer needs. For example, landing gear on rotorcraft 202 may be interchanged so that wheel landing gear system 200 is installed when taxi operations are expected while skid gear is used when landing in snow or soft soil. Because wheel landing gear system 200 may re-use at least some of the skid landing gear components, such as aft landing gear fitting 208, and because wheel landing gear system 200 may be easily installed, without major modifications, on rotorcraft 202, the cost, weight and complexity of wheel landing gear system 200 is reduced. Instead of using expensive shock absorbers like those illustrated in FIGS. 2A-2B, the illustrative embodiments use the flexibility of cross tube 210 to absorb shocks experienced by rotorcraft 202. The illustrative embodiments also address ground resonance issues while using at least some of the same attachment points used for skid landing gear.

Figure 4A:
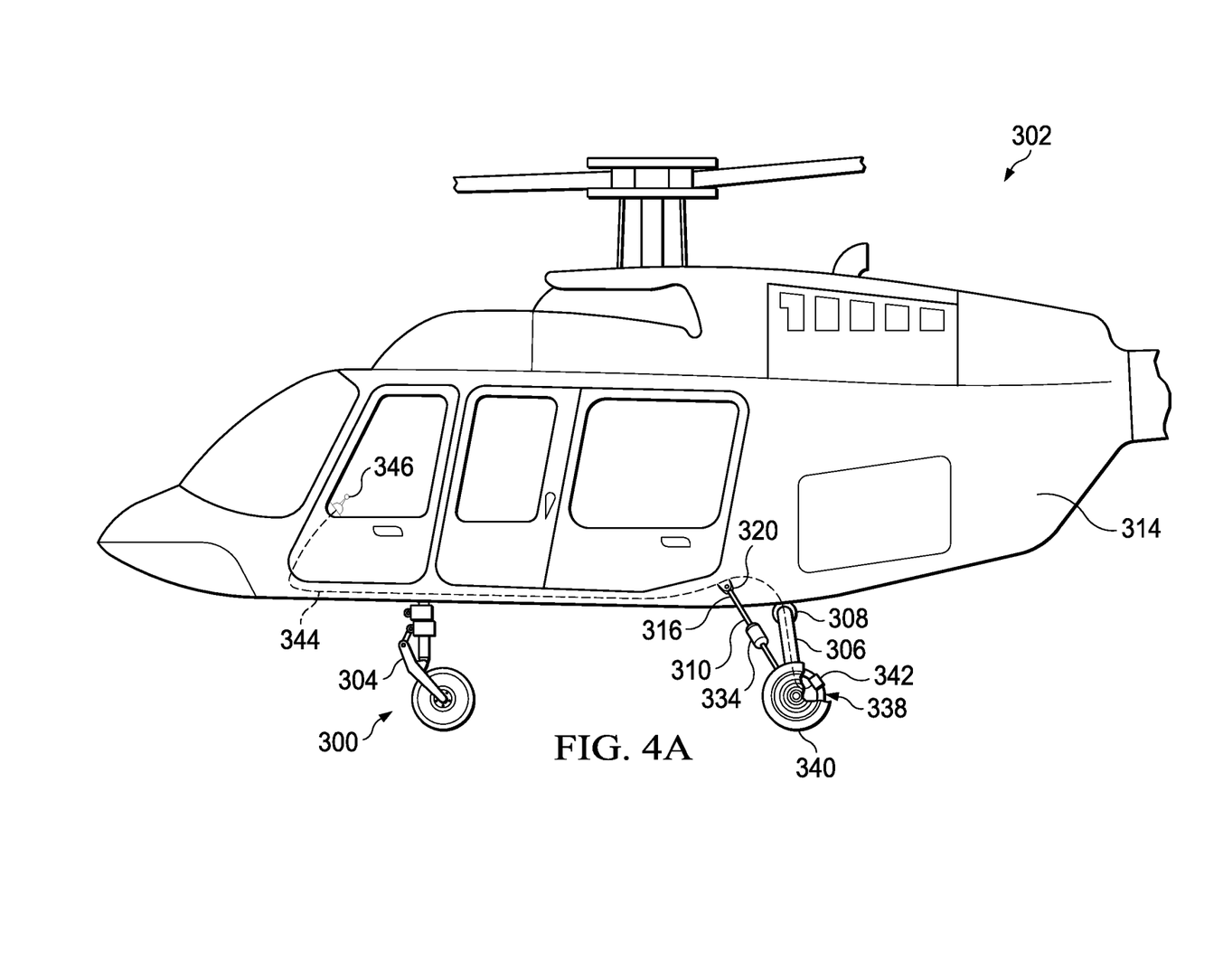
FIGS. 4A-4C are various views of a landing gear system for a rotorcraft in accordance with embodiments of the present disclosure.
Figure 4B:
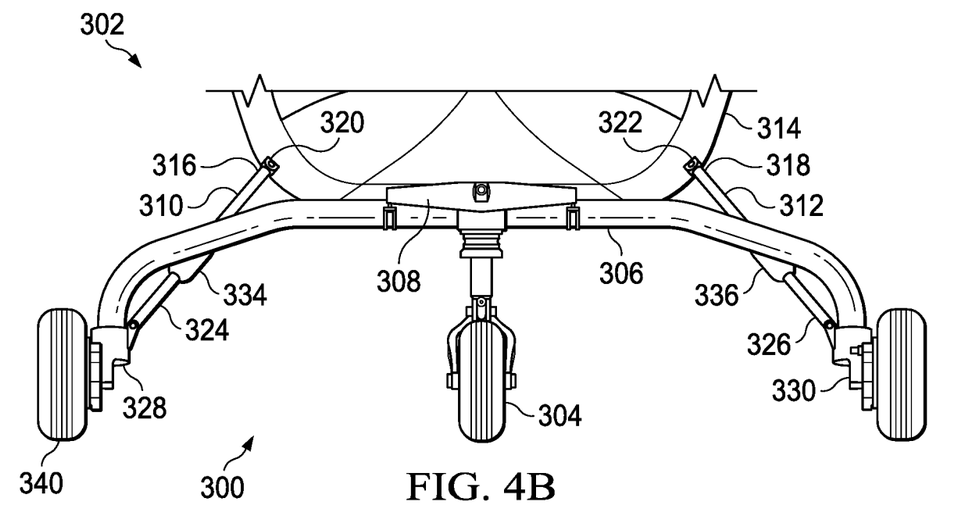
Figure 4C:
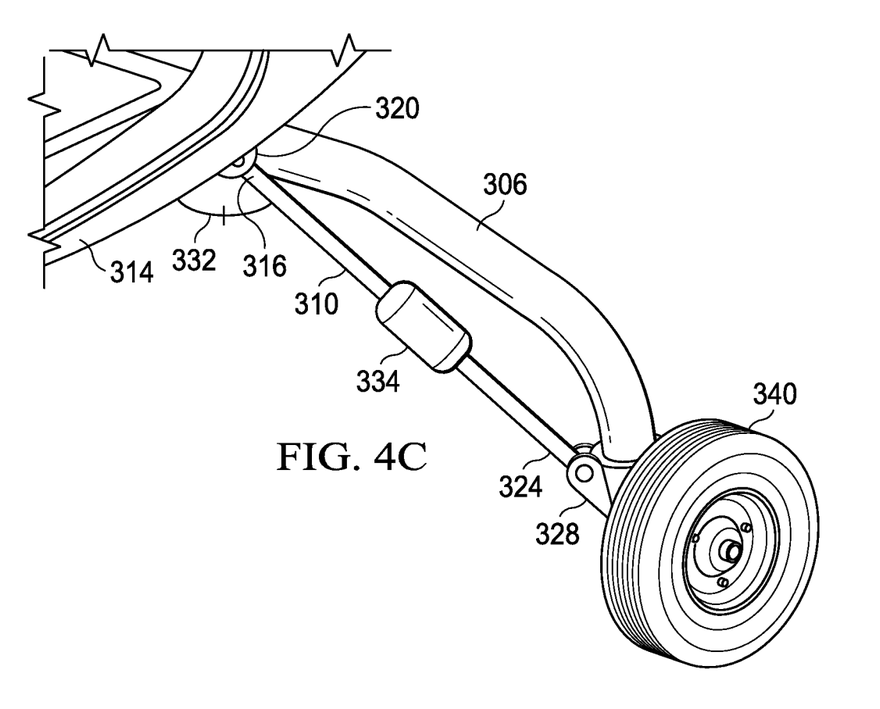

Referring to FIGS. 4A-4C in the drawings, a rotorcraft including landing gear system 300 is schematically illustrated and generally designated 302. Landing gear system 300 includes forward wheel assembly 304. Cross tube 306 is rotatably coupled to aft landing gear fitting 308. In contrast to landing gear system 200 shown in FIGS. 3A-3C, landing gear system 300 includes one or more struts 310, 312 interposed between, and coupled to, fuselage 314 and cross tube 306. Top ends 316, 318 of struts 310, 312 are coupled to fittings 320, 322 provisioned on the airframe of fuselage 314, respectively. Bottom ends 324, 326 of struts 310, 312 are coupled to wheel fittings 328, 330, respectively. In other embodiments, bottom ends 324, 326 may be coupled directly to cross tube 306. Struts 310, 312 stabilize cross tube 306, and thus contribute to the overall stability of the aft portion of landing gear system 300. The combined stiffness of cross tube 306 and struts 310, 312 can be tailored or customized to act as a leaf spring suspension, providing enough flexibility to allow rotorcraft 302 to rock about a pivot axis extending in the fore-aft direction, while keeping rotorcraft 302 level when no aerodynamic load is applied on the ground. The combined stiffness may be tailored or customized by changing strut angle 332 at which struts 310, 312 are oriented relative to fuselage 314 and/or cross tube 306. Fittings 320, 322 may allow for a rotatable connection between struts 310, 312 and fuselage 314 to facilitate fuselage rocking relative to the pivot axis.

Struts 310, 312 may each include an inline damper 334, 336 to provide additional dampening capabilities. Because most dampening may be achieved by the leaf spring suspension of cross tube 306, in some embodiments small or inexpensive inline dampers 334, 336 may be used to tweak the stiffness of landing gear system 300 to reduce or avoid ground resonance. In other embodiments, inline dampers 334, 336 may be shock absorbers, springs or other elastic members. In some embodiments, landing gear system 300 includes a braking subsystem 338 to selectively reduce the rotation of one or more of wheels 340 of rotorcraft 302. Braking subsystem 338 enhances the ground capabilities of rotorcraft 302 by, for example, allowing rotorcraft 302 to land on sloped ground. Braking subsystem 338 may include a braking mechanism 342, such as a friction or electromagnetic-based braking mechanism, at one or more of wheels 340. Braking mechanism 342 may be activated by a push-pull cable, hydraulic line or other braking line 344, which leads to an input 346, such as a lever, in the cockpit of rotorcraft 302.

Figure 5A:
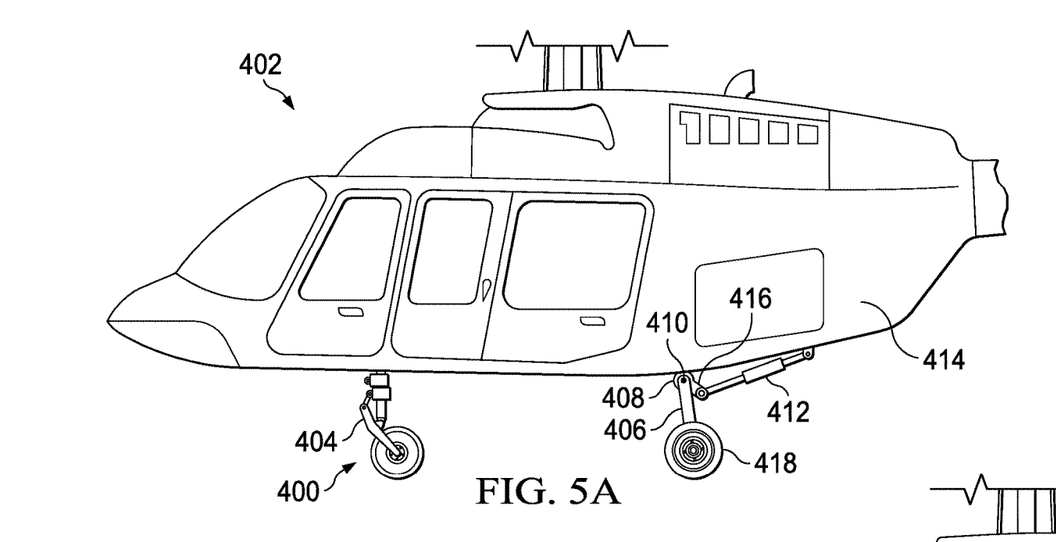
FIGS. 5A-5B are side views of a landing gear system for a rotorcraft in accordance with embodiments of the present disclosure.
Figure 5B:
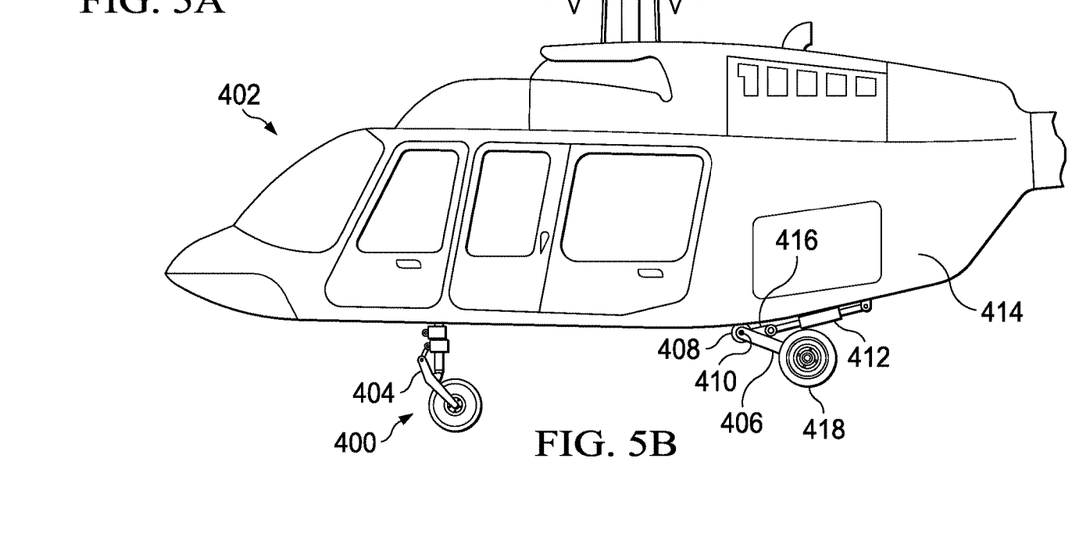

Referring to FIGS. 5A-5B in the drawings, a rotorcraft including landing gear system 400 is schematically illustrated and generally designated 402. Landing gear system 400 includes forward wheel assembly 404. Cross tube 406 is rotatably coupled to aft landing gear fitting 408 about an axis 410 lateral to rotorcraft 402. Landing gear system 400 also includes a retraction actuator 412 interposed between, and coupled to, cross tube 406 and fuselage 414. Retraction actuator 412 may be coupled to cross tube 406 via a crank 416, such as a bell crank. Retraction actuator 412 rotates cross tube 406 between an extended position, as shown in FIG. 5A, and a retracted position, as shown in FIG. 5B, about lateral axis 410. When in the retracted position, wheels 418 retract in the aft direction. Retracting cross tube 406 and wheels 418 in this manner may be useful in reducing the drag of rotorcraft 402, especially when rotorcraft 402 is in forward flight. In some embodiments, rotorcraft 402 may include a fairing (not shown) that partially or fully covers cross tube 406 to prevent drag during flight.

Figure 6A:
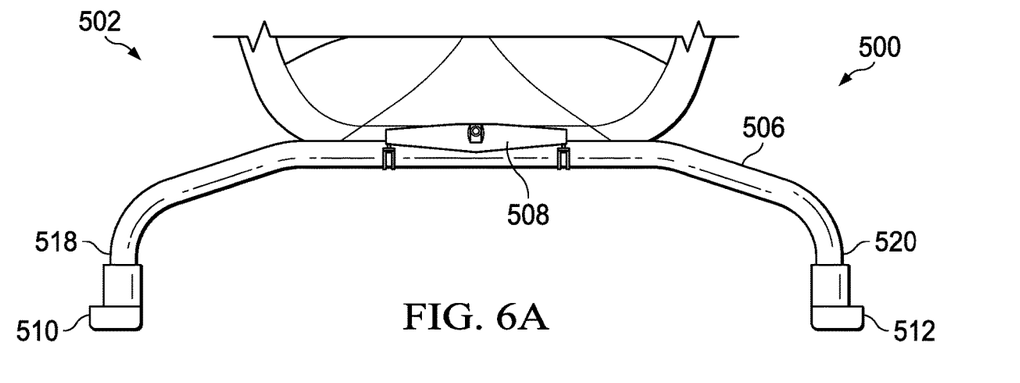
FIGS. 6A-6C are rear views of a landing gear system for a rotorcraft in accordance with embodiments of the present disclosure.
Figure 6B:
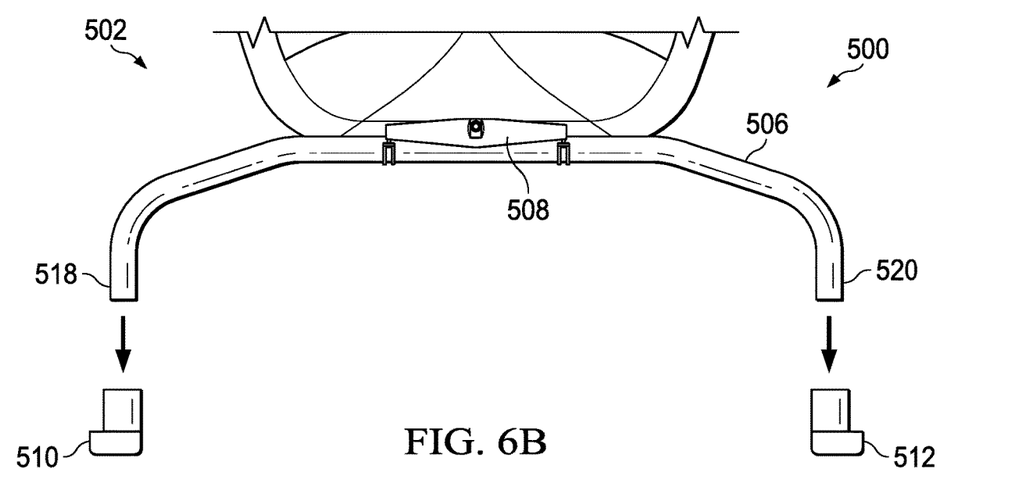
Figure 6C:
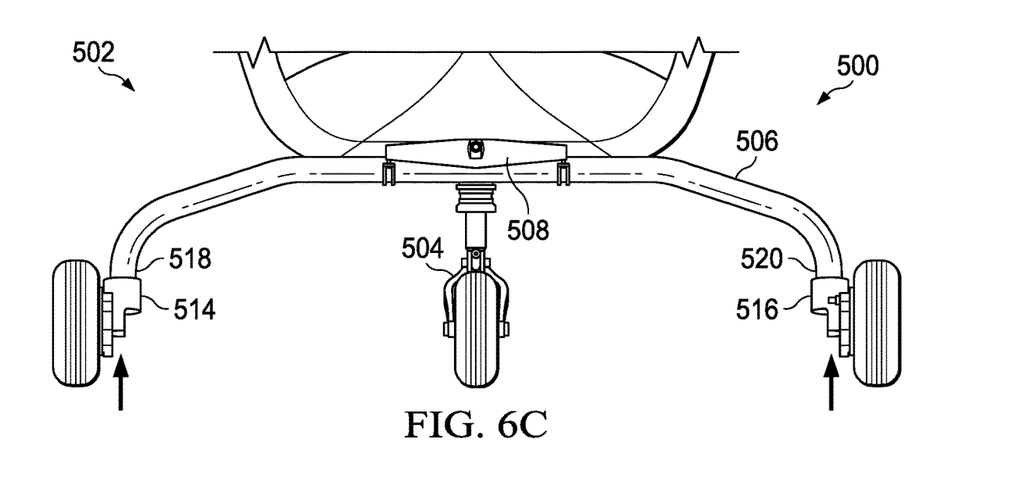

Referring to FIGS. 6A-6C in the drawings, a rotorcraft including landing gear system 500 is schematically illustrated and generally designated 502. Landing gear system 500 includes forward wheel assembly 504. Cross tube 506 is rotatably coupled to aft landing gear fitting 508. Landing gear system 500 includes skids 510, 512 that are interchangeable with wheel fittings 514, 516. In replacing wheel fittings 514, 516, skids 510, 512 may be removed from ends 518, 520 of cross tube 506, as shown in FIG. 6B. Cross tube 506 remains coupled to aft landing gear fitting 508. Wheel fittings 514, 516 may then be coupled to ends 518, 520 of cross tube 506, respectively, as shown in FIG. 6C. In some embodiments, a forward skid gear cross tube (not shown) may be removed and forward wheel assembly 504 may be installed in its place. By re-using cross tube 506 for both skids 510, 512 and wheel fittings 514, 516, landing gear system 500 saves the time and cost of installing a separate cross tube when converting from skid landing gear to a wheel landing gear system, especially in view of the relatively high cost of cross tube 506 as compared to other components of landing gear system 500.

Figure 7:
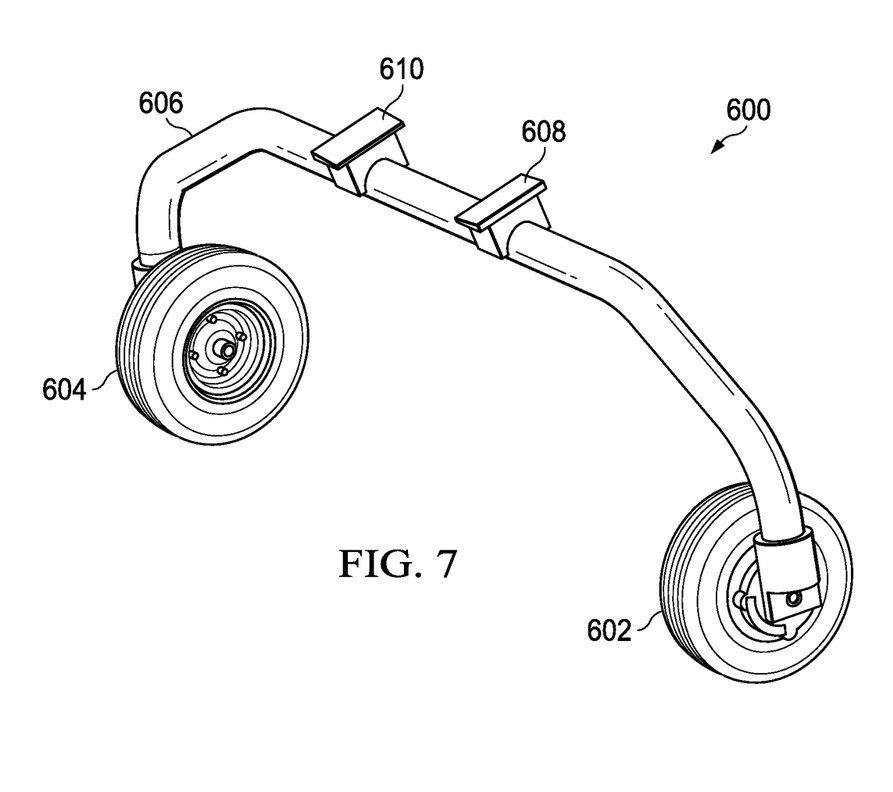
FIG. 7 is an isometric view of a portion of a landing gear system for a rotorcraft in accordance with embodiments of the present disclosure.

Referring to FIG. 7 in the drawings, the aft portion of a landing gear system is schematically illustrated and generally designated 600. In contrast to landing gear system 200 in FIGS. 3A-3C, wheels 602, 604 face toward the longitudinal centerline of the aircraft to which they are coupled. Wheels 602, 604 are therefore inward-facing wheels. Cross tube 606 is fixedly coupled to the underside of a fuselage via mounts 608, 610. Mounts 608, 610 may be used in lieu of aft landing gear fitting 208 illustrated in FIGS. 3A-3C. In some embodiments, mounts 608, 610 may receive either a wheel-bearing or skid-bearing cross tube so that landing gear system 600 is capable of utilizing either skids or wheels.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A landing gear system for an aircraft comprising:
an aft landing gear fitting coupled to the aircraft;

a cross tube rotatably coupled to the aft landing gear fitting, the cross tube having first and second ends;

first and second wheel fittings configured to be coupled to the first and second ends of the cross tube, respectively;

first and second wheels rotatably coupled to the first and second wheel fittings, respectively; and first and second skids configured to be coupled to the first and second ends of the cross tube, the first and second skids interchangeable with the first and second wheel fittings on the ends of the cross tube.

2. The landing gear system as recited in claim 1 wherein the aft landing gear fitting further comprises a pivot axis extending in a fore-aft direction, the cross tube rotatably coupled to the aft landing gear fitting about the pivot axis.

3. The landing gear system as recited in claim 1 wherein the aft landing gear fitting is further adapted to receive a skid gear cross tube, the skid gear cross tube and the cross tube adapted to be interchangeably coupled to the aft landing gear fitting.

4. The landing gear system as recited in claim 1 wherein the cross tube further comprises a noncurved horizontal midsection rotatably coupled to the aft landing gear fitting.

5. The landing gear system as recited in claim 4 wherein the cross tube further comprises first and second transition sections each interposed between the midsection and one of the ends of the cross tube, the first transition section sloping downward from the midsection to the first end of the cross tube, the second transition section sloping downward from the midsection to the second end of the cross tube.

6. The landing gear system as recited in claim 1 wherein the cross tube further comprises a material adapted to flex to absorb shocks caused by ground operations of the aircraft.

7. The landing gear system as recited in claim 1 wherein the cross tube forms a shape adapted to flex to absorb shocks caused by ground operations of the aircraft.

8. The landing gear system as recited in claim 1 wherein the cross tube is rotatably coupled to the aft landing gear fitting about an axis lateral to the aircraft.

9. The landing gear system as recited in claim 8 further comprising:

a retraction actuator coupled to the cross tube, the retraction actuator adapted to rotate the cross tube between an extended position and a retracted position about the lateral axis.

10. The landing gear system as recited in claim 1 wherein the wheels further comprise outward-facing wheels.

11. The landing gear system as recited in claim 1 wherein the wheels further comprise inward-facing wheels.

12. An aircraft comprising:

a fuselage having an underside; and a landing gear system comprising:

an aft landing gear fitting coupled to the underside of the fuselage;

a cross tube rotatably coupled to the aft landing gear fitting, the cross tube having first and second ends;

first and second wheel fittings configured to be coupled to the first and second ends of the cross tube, respectively;

first and second wheels rotatably coupled to the first and second wheel fittings, respectively; and first and second skids configured to be coupled to the first and second ends of the cross tube, the first and second skids interchangeable with the first and second wheel fittings on the ends of the cross tube.

13. The aircraft as recited in claim 12 wherein the aft landing gear fitting further comprises:

a bridge coupled to the underside of the fuselage; and a pivot connection fixedly coupled to the cross tube;

wherein the pivot connection is rotatably coupled to the bridge at a pivot axis to allow the cross tube to pivot relative to the fuselage.

14. The aircraft as recited in claim 13 wherein the bridge further comprises first and second ends coupled to the underside of the fuselage.

15. The aircraft as recited in claim 13 wherein the aft landing gear fitting further comprises a pivot pin coupling the pivot connection to the bridge at the pivot axis.

16. The aircraft as recited in claim 12 further comprising first and second struts each having first and second ends, the first ends of the struts coupled to the fuselage, the second ends of the struts each coupled to one of the wheel fittings.

17. The aircraft as recited in claim 16 wherein the struts each further comprise an inline damper.

18. The aircraft as recited in claim 12 wherein the landing gear system further comprises a braking subsystem adapted to selectively reduce rotation of the wheels.

19. The aircraft as recited in claim 12 wherein the landing gear system further comprises a forward wheel assembly removably coupled to the underside of the fuselage.

* * * * *